Figure 1:
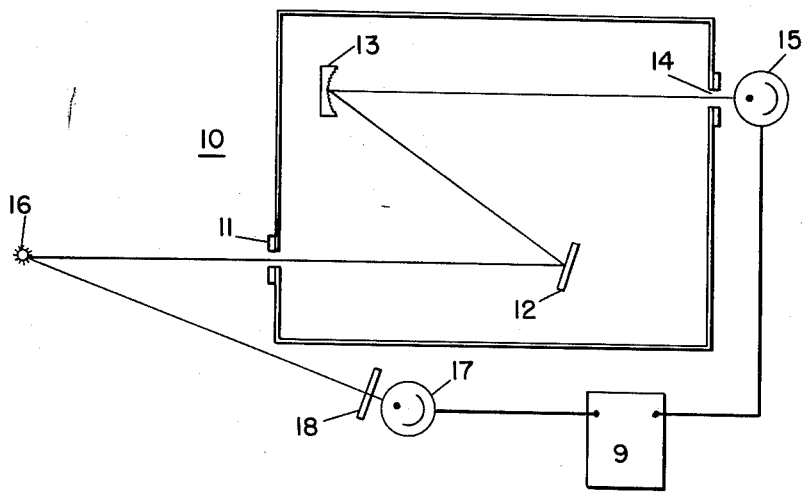

Feb. 14, 1956　　　　　J. H. ENNS　　　　　2,734,418
SPECTROMETER SYSTEM WITH RECEIVER
FOR REFERENCE BAND ILLUMINATION
Filed April 19, 1950　　　　　　　　　　3 Sheets-Sheet 1

INVENTOR.
JOHN H. ENNS
BY
Woodcock and Phelan
ATTORNEYS.

Feb. 14, 1956 J. H. ENNS 2,734,418
SPECTROMETER SYSTEM WITH RECEIVER
FOR REFERENCE BAND ILLUMINATION
Filed April 19, 1950 3 Sheets-Sheet 2

INVENTOR.
JOHN H. ENNS
BY
Woodcock and Phelan
ATTORNEYS.

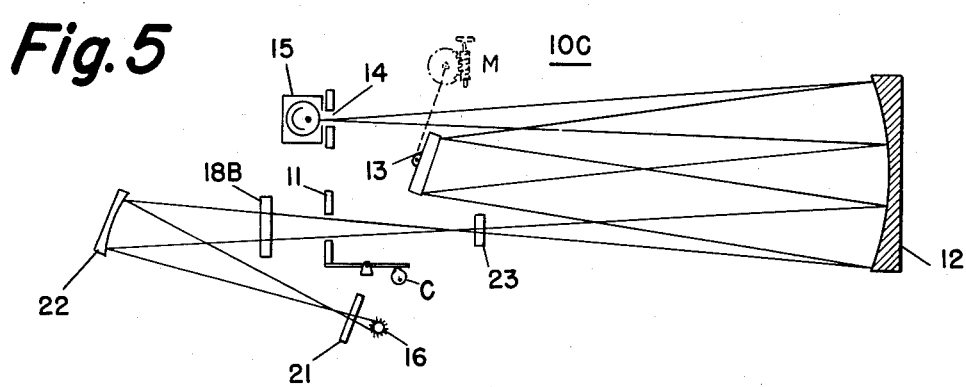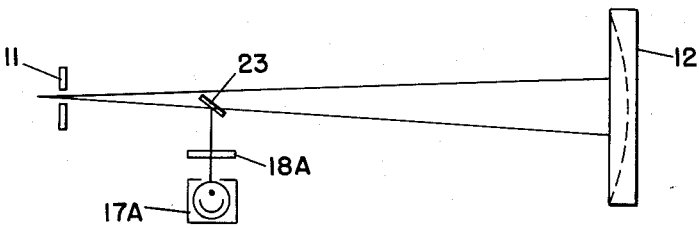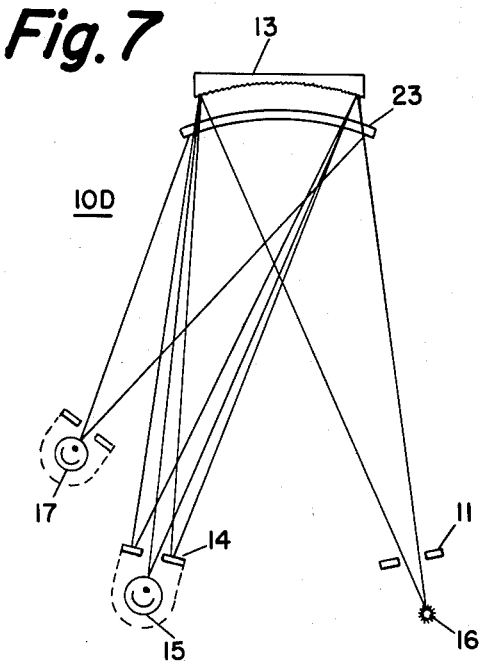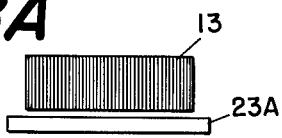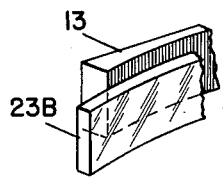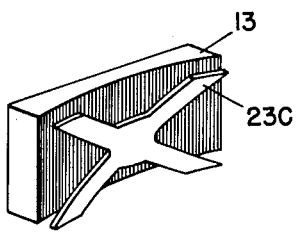
INVENTOR.
JOHN H. ENNS

United States Patent Office 2,734,418
Patented Feb. 14, 1956

2,734,418

SPECTROMETER SYSTEM WITH RECEIVER FOR REFERENCE BAND ILLUMINATION

John H. Enns, Ann Arbor, Mich., assignor to Leeds and Northrup Company, Philadelphia, Pa., a corporation of Pennsylvania Application April 19, 1950, Serial No. 156,763

11 Claims. (Cl. 88—14)

This invention relates to emission spectroscopy and particularly to direct determination of the percentage composition of specimens by spectrochemical analysis.

Quantitative measurements in emission spectroscopy employing either photographic or direct-recording methods are based upon the long established internal-standard principle. In both methods quantitative analysis involves intensity measurements of two spectrum lines, one line being of the matrix element whose concentration is to be determined and the other line, called the internal-standard line, is of an element whose concentration is known. The element of known concentration is usually a large or major constituent of the specimen matrix, or in some cases, for which the method of mixtures is employed, is an element known not to be present in the original specimen but added thereto in known and usually small quantity for analytical purpose. In all of the foregoing, both the reference line and the analytical line originate in the excited specimen serving as a radiation source for the spectrometer and both are separated from the overall emitted radiation by the grating, prism, or other spectrum-producing means of the spectrometer.

The aforesaid photographic and prior direct-reading methods have the practical disadvantage that the range of variation of the reference element for which a single analytical curve affords sufficient accuracy is quite limited: for example, a curve suited for analysis when the per cent concentration of the reference element is about 90% would not be suited for analysis of specimens in which the concentration of that element is greater than about 93% or less than about 87%.

In accordance with the present invention, the intensity of a spectrum line of each element whose concentration is to be determined is compared with respect to the intensity of a selected band of the total radiation from the excited specimen: there is no segregation of a reference line as in the aforesaid prior spectrographic methods and systems. The reference band effectively viewed by the reference photocell, or equivalent radiation receiver, is undispersed radiation and embraces the principal radiation from the constituents of the specimen yet is limited by the response characteristic of the receiver alone or in combination with an optical filter to exclude non-representative radiation due to components of the ambient atmosphere, or due to specimen components having appreciably different excitation characteristics i. e., appreciably different excitation energies and resultant radiation wavelength patterns. With such arrangement, a single analytical curve affords suitably high accuracy over a substantially enhanced range of variation of any of the constituent elements of the specimen matrix: specifically, the range of variation may be several times that tolerable with the single line reference arrangements.

Further in accordance with the invention but more specifically, the reference-band receiver may be positioned externally or internally of the spectrometer to receive a band of undispersed radiation from the excited specimen. Preferably, the reference-band receiver is disposed internally of the spectrometer to avoid effect of any variation of the entrance slit of the spectrometer upon the ratio of the intensities of the radiation respectively impressed upon the reference receiver and the analytical or line-radiation receiver.

Figure 2:
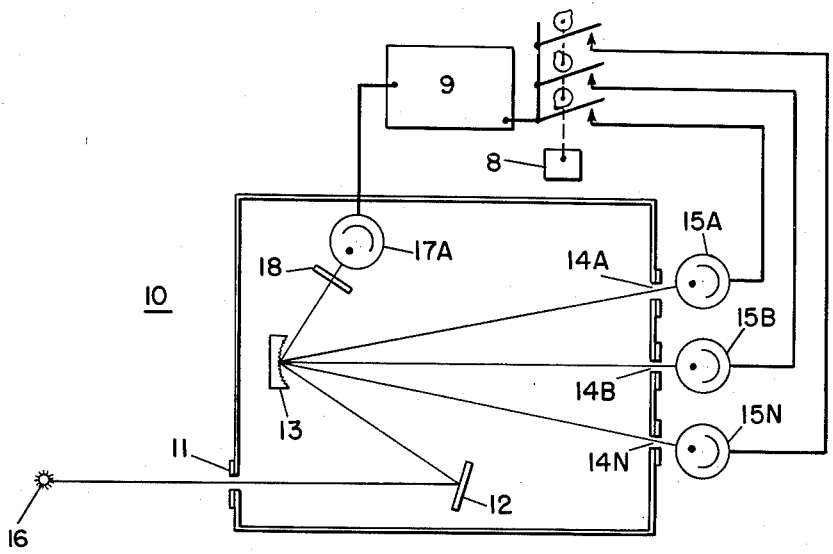
Figure 3:
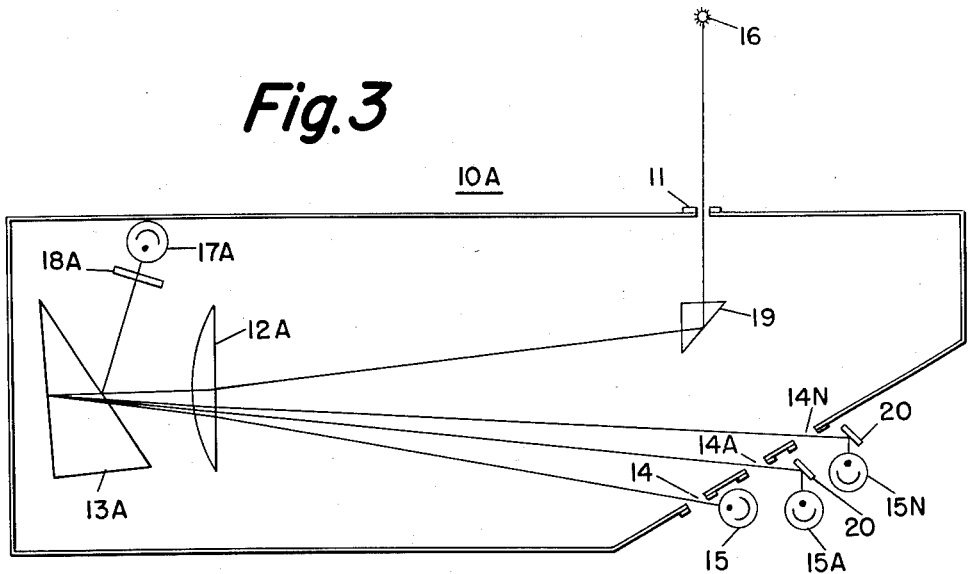
Figure 4:
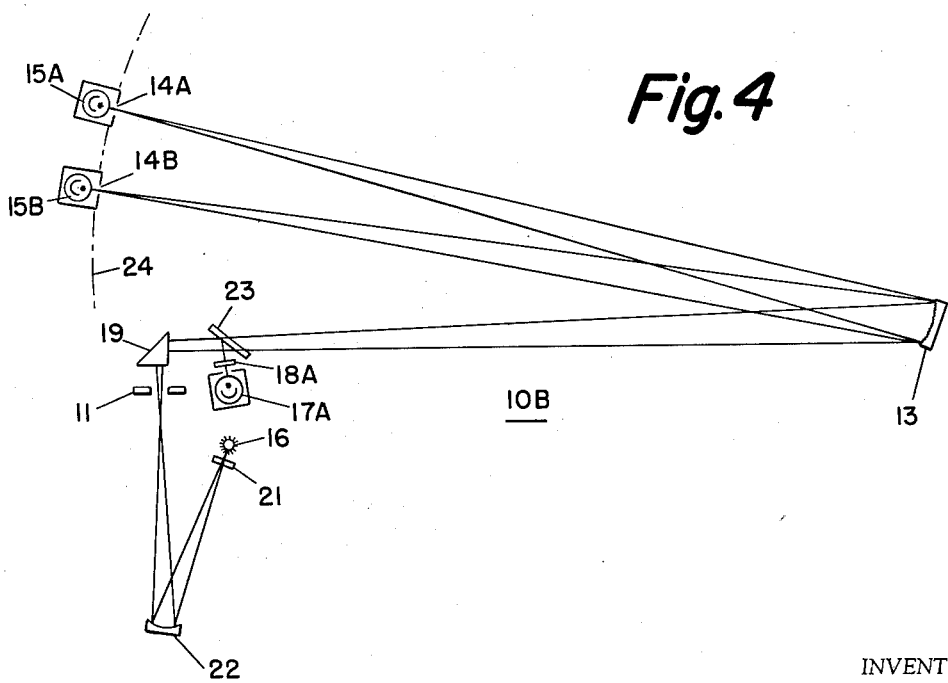

For a more detailed understanding of the invention and for illustration of spectrographic systems embodying it, reference is made to the accompanying drawings in which:

Figs. 1 and 2 schematically illustrate spectrometers of the grating type having the reference-band radiation receivers respectively disposed externally and internally of the spectrometer;

Fig. 3 schematically illustrates a spectrometer of the prism type with indicated location of an internal reference-band receiver;

Fig. 4 schematically illustrates another grating type of spectrometer having an internal reference-band receiver and line-scanning receivers;

Figs. 5 and 6 are plan and elevational views respectively of another spectrometer with an internal reference-band receiver and a line-scanning receiver;

Fig. 7 schematically illustrates a modification of the spectrometer shown in Figs. 5 and 6; and Figs. 8A, 8B and 8C are alternative forms of components of the system of Fig. 7.

Referring to Fig. 1, the spectrometer 10 has an entrance slit 11 through which radiation from an excited specimen passes to a collimating mirror 12 which directs the radiation to the diffraction grating 13. From the spectrum produced by the grating, a line corresponding with an element of the excited specimen is selected by the properly positioned exit slit 14 for passage to a radiation receiver such as a phototube 15. The output current of phototube 15 is therefore a function of the line-intensity which in turn depends upon the amount of the corresponding element present in the specimen. Undiffracted radiation from the excited specimen 16 is received by a second radiation receiver 17 which in this particular arrangement is external to the spectrometer; either by the response-characteristic of the receiver 17 itself or in combination with a filter 18, the output of the phototube 17 corresponds with the intensity within a band of wavelengths which embraces the principal radiation from all elements of the specimen and excludes undesired, incidental radiation from other sources, such as ambient atmospheric components excited concurrently with the specimen, or radiation from all constituents whose excitation characteristic (i. e., excitation energies and resultant radiation wavelength patterns) are widely different from those of the constituent element producing the selected specimen line.

For reasons outlined above, the reference receiver 17 should not appreciably respond to radiation lying outside the spectrum band determined by the element lines required in the analysis. A practical example of this is in the case of ferrous alloys whose constituent elements are sufficiently represented by spectrum lines in the interval 2200 to 4000 Angstroms. Limiting the reference receiver response to this interval can be effected by combining a type 1P28 photomultiplier tube or a type 935 phototube and a Corning Glass filter-type 9863. A still narrower band, 3000 to 4000 Angstroms, is available if the filter type 5874 is used with either tube. These photomultiplier tubes and filters identified as suitable for limiting the receiver response of particular bands of radiation are per se standard items whose characteristics are well known in the art and are described in generally available technical literature. The type 5874 filter has a transmission less than fifty per cent above 365 millimicrons; the type 9863 filter has a transmission less than forty per cent above 254 millimicrons; the 1P28 and 935 type phototubes each has a sensitive range from 2,000 to 7,000 A with maximum sensitivity at about 3,400 A.

The ratio of the output currents of the radiation receivers 15 and 17 may be determined by inclusion of the tubes in an electrical network, generically represented by block 9, such as shown in copending application Serial No. 715,936 or application Serial No. 662,531 upon which have issued Williams Patent 2,522,976 and Dieke Patent 2,572,119 respectively. In either case, there is obtained a direct indication of the concentration of the unknown constituent producing the spectrum line, to which photocell 15 is positioned to respond, in terms of a reference band of radiation. When, as usual, it is desired to determine the per cent concentration of more than one element, a corresponding number of tube-slit units 14—15 may be positioned to view the corresponding spectrum lines, or, as in later described modification, one or more scanning cells may be used.

The arrangement shown in Fig. 2 is essentially the same as that of Fig. 1 except that the reference cell 17A is within the spectrometer and in such angular position that it views a band of undiffracted radiation as reflected from the grating 13. An advantage of this arrangement is that any variation in the radiation passed by the entrance slit of the spectrometer, such as occurs in arc analyses by wandering of the arc over the surface of the specimen or due to variations in slit opening, is without effect upon the ratio of the radiations respectively received by the reference cell 17A and each of the cells 15A—15N viewing the selected lines or line. When several spectrum lines, corresponding with different components of the specimen or sample, are of interest, the spectrum produced by the grating, or preferably only those portions of it adjacent and including the lines of interest may be scanned, as later described; or as indicated in Fig. 2, the selected spectrum lines may pass correspondingly located fixed slits 14A—14N respectively associated with the radiation receivers of photocells 15A—15N.

For direct reading of the percentage composition of each of the selected constituents, the corresponding cells 15A—15N may each in turn be connected, as by timer switch 8, in circuit with reference cell 17A for measurement of the output-current ratio. A more complex arrangement may use recorders in number corresponding with the number of analyzing cells 15A—15N for simultaneously measuring the ratio of the output of each analyzer cell with respect to that of the reference cell: another arrangement would be to charge capacitors each in accord with the ratio of the output of one of the analyzing cells and the reference cell and then in sequence discharge these condensers into a recorder circuit by a selector switch.

Although the spectrometers shown in Figs. 1 and 2 are of the Wadsworth type, it shall be understood the invention is also applicable to other types of grating spectrometers.

In the prism type of spectrometer 10A shown in Fig. 3, the radiation from the specimen source 16 enters the entrance slit 11 and is diverted by the fore-prism 19 through the collimating lens 12A to the dispersing prism 13A which in the particular spectrometer shown is aluminum-backed. The spectrum line or lines to be used in analysis of the specimen are selected by a corresponding number of exit slits 14—14N for passage to corresponding radiation receivers 15—15N. Where space requirements make it necessary, mirrors 20 may be used to reflect line-radiation passed by the exit slits to the photo-receivers.

The reference-band receiver of Fig. 3 may be disposed either externally of the spectrometer, as indicated in Fig. 1 by the location of phototube 17, or within the spectrometer itself, as indicated in Fig. 3 by tube 17A. The latter arrangement, for reasons above discussed, is preferred since there is eliminated any effect upon the measurements of variations in the radiation passed by the entrance slit. In Fig. 3, the phototube 17A is positioned to receive a band of undispersed spectral energy reflected from the face of the dispersing prism 13A.

The outputs of the reference tube 17 or 17A and each of the analyzing tubes 15—15N may be utilized in any of the modes above described for direct-recording or indication of the percentage concentration of each of the elements corresponding with the selected spectrum lines. Although the spectrometer shown in Fig. 3 is of the Littrow type, it shall be understood that the invention is not restricted thereto and may be used with other types of prism spectrometers.

In the spectrometer 10B shown in Fig. 4, the radiation from the spectrographic light-source, that is, the excited specimen 16, passes through a diffusion screen 21 and is focused by the mirror 22 upon the entrance slit 11 of the spectrometer. The radiation passed by slit 11 is directed by the fore-prism 19 onto a diffraction grating 13 which produces a spectrum with lines in focus along the Rowland circle 24. The analyzing receivers 15A, 15B may be moved, as more fully shown in the aforesaid Dieke patent, along the focal curve successively to scan different lines of the spectrum and at proper times are connected into a ratio-measuring circuit for comparing the intensity of a selected line relative to the concurrent output of the reference cell 17A which in accord with the present invention depends upon a band selected from the overall radiation from the source elements and not upon the intensity of one reference line.

Although the reference cell of Fig. 4 may be, as in Fig. 1, external to the spectrometer, it is desirably within the spectrometer and receives a band of undiffracted radiation by reflection from the member 23, of quartz or the like, transparent to and in the path of radiation to the grating 13. Thus, part of the total radiation passed by the slit 11 is reflected onto the reference cell 17A, the filter 18A being provided, when necessary, to exclude from cell 17A all radiation outside a preferred spectral band as outlined above.

In the spectrometer 10C shown in Figs. 5 and 6, the radiation from the excited specimen 16 may be diffused by screen 21 and focused by mirror 22 onto the entrance slit 11 of the spectrometer. At least by far the major proportion of the radiation passed by the slit 11 is directed by the collimating mirror 12 upon grating 13. A desired line of the spectrum produced by grating 13 is focused by mirror 12 upon the slit 14 of the analyzing cell 15. In this arrangement, the angle of the grating 13 may be shifted, as by any well known arrangement exemplified by the worm, worm-wheel drive M, to change the spectrum line viewed by the stationary analyzing receiver 15. Thus, the lines corresponding with different elements of the specimen may be successively viewed by the single analyzing receiver 15. Undiffracted reference radiation for the reference-band receiver 17A is derived from the total radiation which passes the entrance slit 11 by a partially transparent and partially reflective member 23 of quartz, for example, which may be disposed between the entrance slit 11 and collimating mirror 12 of the spectrometer. A similar arrangement of mirror 23 and reference cell 17A may be used in the prism type of spectrometer, Fig. 3, instead of using a surface reflection of the prism 13A as a source of undiffracted radiant energy for the photocell 17A.

When the source 16, Fig. 5, is of nature providing for sufficiently high intensity of the individual spectrum lines, the filter 18B for cutting off radiation of wavelengths longer than 4000 Angstroms may be disposed in advance of the entrance slit 11; when the source does not provide for sufficiently high intensity of the lines, such filter, as exemplified by filter 18A (Fig. 6), may be disposed between the mirror 23 or equivalent and the reference cell 17A.

Preferably and as more fully disclosed in copending application Serial No. 241,194, Fastie (filed August 10, 1951, and assigned to applicant's assignee), the slit member 11 may be rocked or oscillated for scanning of a selected line by the analyzing cell 15. In brief, in an analysis, the grating 13 is stepped to successive positions for each of which one of the element lines of interest falls upon the analyzing cell 15 and for each position the entrance slit member 11 is rocked, as by cam C, through a small angle for scanning of the line and closely adjacent areas of the spectrum. The general arrangement shown in Figs. 5 and 6 is comprehended by my invention, but the specific form thereof and circuit relations are more fully disclosed and claimed in the aforesaid copending application Serial No. 241,194.

In the spectrometer 10D shown in Fig. 7, the radiation from the excited specimen 16 is passed by the entrance slit 11 of the spectrometer to the diffraction grating 13 which is angularly adjustable to position and focus any selected line of the spectrum upon the slit 14 of the analyzing receiver 15. Part of the radiation passed by the slit 11 is reflected by mirror 23, which is disposed adjacent and in front of the grating 13, onto the reference receiver 17. The mirror 23 is preferably stationary and, as in the preceding modifications, effects response of cell 17 to substantially all components of the radiation from the elements of the specimen. The exclusion of radiation from concurrently excited elements not present in the specimen may be accomplished by means already discussed above. As shown in Fig. 8A, the mirror may be a narrow curved reflecting surface such as provided by an aluminized mirror 23A or a mirror of polished metal such as aluminum. Alternatively, as shown in Fig. 8B, the mirror may be an unbacked quartz mirror 23B of width sufficient to cover the face of the grating and, like mirror 23A, of length equal to the grating 13 plus the extent of its angular movement. In this modification, a reflected portion of the total radiation passing the entrance slit 11 affects the reference receiver 17, the remainder of the radiation being diffracted by the grating 13 to produce a spectrum passing through the quartz plate with focusing of the selected line upon the analyzing receiver 15. In another alternative form of grating and mirror arrangement shown in Fig. 8C, the mirror 23C comprises two crossed narrow reflecting strips which reflect a portion of the total radiation directed to the grating back onto the reference receiver 17.

If, in any of these arrangements generically represented by Fig. 7, the mirror is moved with the grating, the mechanism for rotating the grating should be coupled to the support or holder for the reference cell 17 to move it through an angle twice that of the grating to maintain proper focusing relation between the mirror and the reference cell. In the arrangement of Fig. 7 using any of the mirror grating arrangements of Figs. 8A–8C, the radiation received by the mirror and the radiation received by the grating are similarly subject to all variables of the source and spectrometer and consequently, the ratio of the outputs of the cells 15 and 17 is unaffected by such variables. This arrangement, like that of Figs. 5 and 6, provides for viewing and scanning of any selected line of the spectrum, produced by grating 13, by a single analyzing receiver.

In all of the foregoing arrangements, a significant feature is that the reference cell is excited not by the radiation of a selected single line but by the total undispersed or undiffracted radiation from a band of wavelengths which includes the major emission of the constituents of the specimen and excludes disturbing radiation from incidentally excited elements such as those present in the ambient atmosphere. For brevity in the appended claims, the term "dispersion" is generically used to connote separation of complex radiation into its components of different wavelengths either by a prism or by a grating. From the standpoint of construction or manipulation, the present arrangement has the advantage that the reference tube is not in the path of a scanning tube if movable scanning tubes are used, nor does it require the use of a mirror arrangement necessary in fixed analyzing receiver arrangement when the reference line is closely adjacent a line of interest. It also makes possible the determination of percentage composition by ratio measurements using a rotatable grating spectrometer and a single stationary analyzing receiver.

In general, the invention is applicable to all analyses made by emission spectroscopy: specifically, the samples may be metallurgical specimens such as specimens of steel, non-ferrous alloys and the like and is of particular advantage when the specimens to be checked are of a furnace melt where time is of essence in making an analysis. As exemplary of arrangements for exciting such specimens, reference may be had to U. S. Letters Patent 2,456,116 and to copending application Serial No. 93,491, filed May 16, 1949, upon which has issued U. S. Letters Patent 2,541,877.

It shall be understood the invention is not limited to the particular exemplary embodiments specifically above described and that changes and modifications may be made within the scope of the appended claims.

What is claimed is:

1. A system for spectrochemical determination of the percentage concentration of an element in a specimen which comprises means for exciting the specimen to emit radiation from all elements of the specimen and from any ambient atmosphere components incidentally present and excited concurrently with the specimen, a spectrometer upon which said radiation is impressed, dispersion means in said spectrometer for dispersing the impressed radiation to produce a spectrum, means including a radiation receiver for producing an output corresponding with the intensity of a spectrum line of said element of the specimen, means including a second radiation receiver and associated wavelength-selective means for producing an output corresponding with the intensity of the undispersed radiation within a band of wavelengths selected to include the principal radiation from elements of the specimen and to exclude radiation from said ambient atmosphere components and from constituents having excitation energies and resultant radiation wavelength patterns substantially different from those of the element producing said spectrum line, and measuring means in circuit with said radiation receivers responsive to the ratio of said outputs, which ratio affords high accuracy in quantitative determination of said element despite substantial variation of any of the constituent elements of the specimen matrix.

2. An arrangement as in claim 1 in which means are provided for effecting relative movement of the spectrum-producing means and the first-named radiation receiver to effect scanning in determination of the ratio of the outputs of said receivers for lines of different elements of the specimen.

3. An arrangement as in claim 1 in which a plurality of radiation receivers are positioned respectively to view spectrum lines of different elements of the specimen and whose outputs are each compared with the output of the second receiver responsive to radiation from all of said elements.

4. An arrangement as in claim 1 in which the second radiation receiver is substantially non-responsive to wavelengths longer than 4,000 Angstroms.

5. An arrangement as in claim 1 in which the second receiver is external to the spectrometer.

6. An arrangement as in claim 5 in which in addition a diffusion screen is interposed between the second receiver and the excited specimen.

7. An arrangement as in claim 1 in which the second receiver is within the spectrometer for elimination of the effect of variations of the entrance slit of the spectrometer upon the ratio of said outputs of the receivers.

8. An arrangement as in claim 7 in which the spectrometer is of the grating type and the second radiation receiver is positioned to receive said band of radiation by reflection from the grating.

9. An arrangement as in claim 7 in which the spectrometer is of the prism type and the second radiation receiver is positioned to receive said band of radiation by reflection from the prism.

10. An arrangement as in claim 7 in which a member positioned between the entrance slit of the spectrometer and its spectrum-producing means reflects part of the total radiation passed by the entrance slit to the second radiation receiver.

11. An emisson type system for spectrochemical determination of the percentage concentration of an element in a specimen which comprises means for exciting the specimen to emit radiation from all elements thereof and from ambient atmospheric components present, a spectrometer upon which the emitted radiation is impressed, dispersing means in said spectrometer for producing a spectrum including spectrum lines of said element and of said concurrently excited atmospheric components, ratio measuring means having associated with said spectrometer a first radiation receiver for producing an output corresponding with the intensity of a selected spectrum line of said specimen element and a second radiation receiver for producing an output corresponding to undispersed radiation from the excited specimen and atmosphere within a wavelength band including said selected spectrum line, and structure associated with said second radiation receiver preventing response thereby to radiant energy from said concurrently excited atmospheric components of wavelength lying out of aforesaid band including the selected spectrum line.

References Cited in the file of this patent

UNITED STATES PATENTS

| | | |
|---|---|---|
| 2,395,489 | Major et al. | Feb. 26, 1946 |
| 2,436,104 | Fisher et al. | Feb. 17, 1948 |
| 2,436,262 | Miller | Feb. 17, 1948 |
| 2,502,319 | Golay | Mar. 28, 1950 |

FOREIGN PATENTS

| | | |
|---|---|---|
| 664,233 | Germany | Aug. 24, 1938 |
| 508,802 | Great Britain | July 5, 1939 |